(12) United States Patent
Malik

(10) Patent No.: US 8,539,539 B2
(45) Date of Patent: *Sep. 17, 2013

(54) METHODS, SYSTEMS, AND COMPUTER PROGRAM PRODUCTS FOR DELIVERING A PROGRAM IN ADVANCE OF A SCHEDULED BROADCAST TIME

(75) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/597,422

(22) Filed: Aug. 29, 2012

(65) Prior Publication Data

US 2012/0324522 A1    Dec. 20, 2012

Related U.S. Application Data

(63) Continuation of application No. 12/018,414, filed on Jan. 23, 2008, now Pat. No. 8,272,013.

(51) Int. Cl.
*H04N 7/173*    (2011.01)

(52) U.S. Cl.
USPC ............ 725/114; 725/49; 725/14; 725/82

(58) Field of Classification Search
None
See application file for complete search history.

(56) References Cited

U.S. PATENT DOCUMENTS

| | | | |
|---|---|---|---|
| 6,490,724 B1 | 12/2002 | Ha et al. | |
| 7,107,606 B2 | 9/2006 | Lee | |
| 2002/0097879 A1 | 7/2002 | Hasegawa | |
| 2004/0158868 A1 | 8/2004 | Korst | |
| 2004/0210932 A1 | 10/2004 | Mori et al. | |
| 2004/0213557 A1 | 10/2004 | Krakirian et al. | |
| 2005/0015807 A1* | 1/2005 | Young | 725/86 |
| 2005/0097624 A1 | 5/2005 | Salo et al. | |
| 2006/0230176 A1* | 10/2006 | Dacosta | 709/235 |
| 2008/0101763 A1 | 5/2008 | Bhogal et al. | |
| 2008/0209481 A1* | 8/2008 | Barrett | 725/91 |
| 2009/0113496 A1 | 4/2009 | Kummer | |
| 2010/0319041 A1 | 12/2010 | Ellis | |

* cited by examiner

*Primary Examiner* — Vivek Srivastava
*Assistant Examiner* — Junior Mendoza
(74) *Attorney, Agent, or Firm* — Cantor Colburn LLP

(57) ABSTRACT

A scheduled broadcast time is retrieved for a program that is to be delivered in advance of the scheduled broadcast time, wherein the scheduled broadcast time is associated with a program content identifier for the program. Prior to the scheduled broadcast time, a pre-cast channel is selected on a network by selecting at least one of a currently unused channel or a dedicated pre-cast channel. Prior to the scheduled broadcast time, a signal is sent for placing a viewer program storage device into a pre-cast mode, such that viewing of the pre-cast channel is disabled. Prior to the scheduled broadcast time, the program is delivered to the viewer program storage device over the pre-cast channel, wherein the delivered program is associated with the program content identifier and a time stamp for disabling playback of the delivered program until arrival of the scheduled broadcast time.

20 Claims, 5 Drawing Sheets

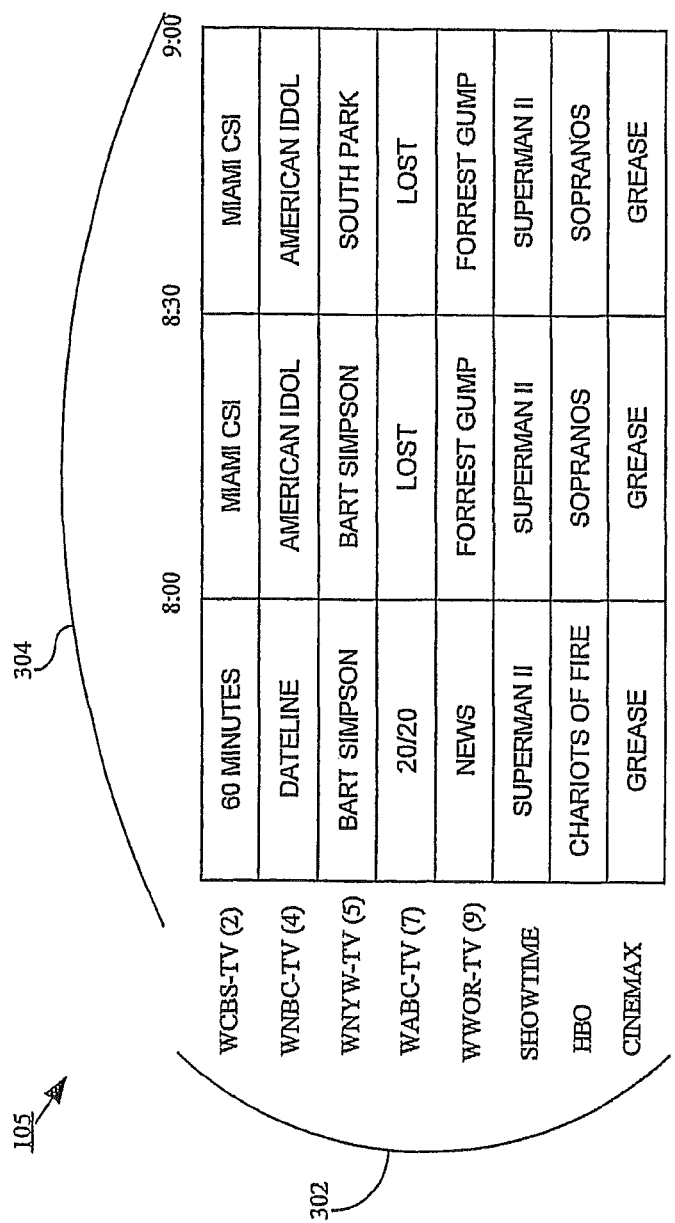

METHODS, SYSTEMS, AND COMPUTER PROGRAM PRODUCTS FOR DELIVERING A PROGRAM IN ADVANCE OF A SCHEDULED BROADCAST TIME

CROSS-REFERENCE TO RELATED APPLICATIONS

This application is a continuation of U.S. patent application Ser. No. 12/018,414 filed Jan. 23, 2008, the contents of which are incorporated herein by reference in their entirety.

BACKGROUND

Exemplary embodiments relate generally to electronic content distribution and, more specifically, to methods, computer program products, and systems for delivering electronic content in advance of a scheduled broadcast time.

Existing techniques for distributing electronic content are subject to bandwidth limitations. For example, an Internet Protocol television (IPTV) connection to a user premises may have a maximum bandwidth of 24 megabytes per second. At the same time, a typical IPTV service may provide users with the choice of hundreds of program streams, such as real time television broadcasts, on-demand video programs, and interactive events. Given the bandwidth limitations of the user premises connection, as well as the finite bandwidth capacities of practical IPTV distribution networks, it is not feasible to simultaneously transmit all available program streams to the user. Rather, in the case of high definition (HD) program streams, it may be possible to simultaneously send no more than two independent program streams to a user.

The practice of transmitting IPTV program streams based upon current user demand leads to network congestion during peak periods of use, as well as inefficient use of the distribution network during off-peak hours. For example, the weekday hours of 7:00 PM to 11:00 PM Eastern Standard Time (EST) represent a prime time viewing period during which a relatively large numbers of users are expected to watch IPTV program streams. During these hours, network capacity may be challenged. By contrast, viewership is relatively low from 2:00 AM to 6:00 AM EST, with portions of the network remaining underutilized. Moreover, some broadcast channels cease operation between the early morning hours of 12:00 AM and 5:00 AM, creating unused bandwidth during this time. In view of the foregoing considerations, what is needed is a technique for distributing electronic content which utilizes the capacity of the network in a more efficient manner.

SUMMARY

Exemplary embodiments relate to methods for delivering a program to a device in advance of a scheduled broadcast time for the program. A scheduled broadcast time is retrieved for the program, wherein the scheduled broadcast time is associated with a program content identifier for the program. Prior to the scheduled broadcast time, a pre-cast channel is selected on a network by selecting at least one of a currently unused channel or a dedicated pre-cast channel. Prior to the scheduled broadcast time, a signal is sent for placing a viewer program storage device into a pre-cast mode, such that viewing of the pre-cast channel is disabled. Prior to the scheduled broadcast time, the program is delivered to the viewer program storage device over the pre-cast channel, wherein the delivered program is associated with the program content identifier and a time stamp for disabling playback of the delivered program until arrival of the scheduled broadcast time.

Another set of exemplary embodiments include computer program products for delivering a program to a device in advance of a scheduled broadcast time for the program. The computer program products include a storage medium readable by a processing circuit and for storing instructions for execution by the processing circuit for facilitating a method. The method includes retrieving a scheduled broadcast time for the program, wherein the scheduled broadcast time is associated with a program content identifier for the program. Prior to the scheduled broadcast time, a pre-cast channel is selected on a network by selecting at least one of a currently unused channel or a dedicated pre-cast channel. Prior to the scheduled broadcast time, a signal is sent for placing a viewer program storage device into a pre-cast mode, such that viewing of the pre-cast channel is disabled. Prior to the scheduled broadcast time, the program is delivered to the viewer program storage device over the pre-cast channel, wherein the delivered program is associated with the program content identifier and a time stamp for disabling playback of the delivered program until arrival of the scheduled broadcast time.

Another set of exemplary embodiments include systems for delivering a program to a device in advance of a scheduled broadcast time for the program. The systems include an input mechanism for receiving a request for a program and a processing mechanism, operatively coupled to the input mechanism. The processing mechanism receives a program content identifier that identifies the requested program and retrieves a scheduled broadcast time for the identified program from a program guide. The scheduled broadcast time for the identified program is associated with the program content identifier such that, prior to the scheduled broadcast time for the identified program, the processing mechanism selects a pre-cast channel on a network by selecting at least one of a currently unused channel or a dedicated pre-cast channel.

Other methods, computer program products, and systems according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF THE DRAWINGS

Referring now to the drawings wherein like elements are numbered alike in the several FIGURES:

FIG. 3 is a graphical representation of an illustrative electronic program guide (EPG) that may be employed in connection with the procedure of FIGS. 2A and 2B.

The detailed description explains the exemplary embodiments, together with advantages and features, by way of example with reference to the drawings.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
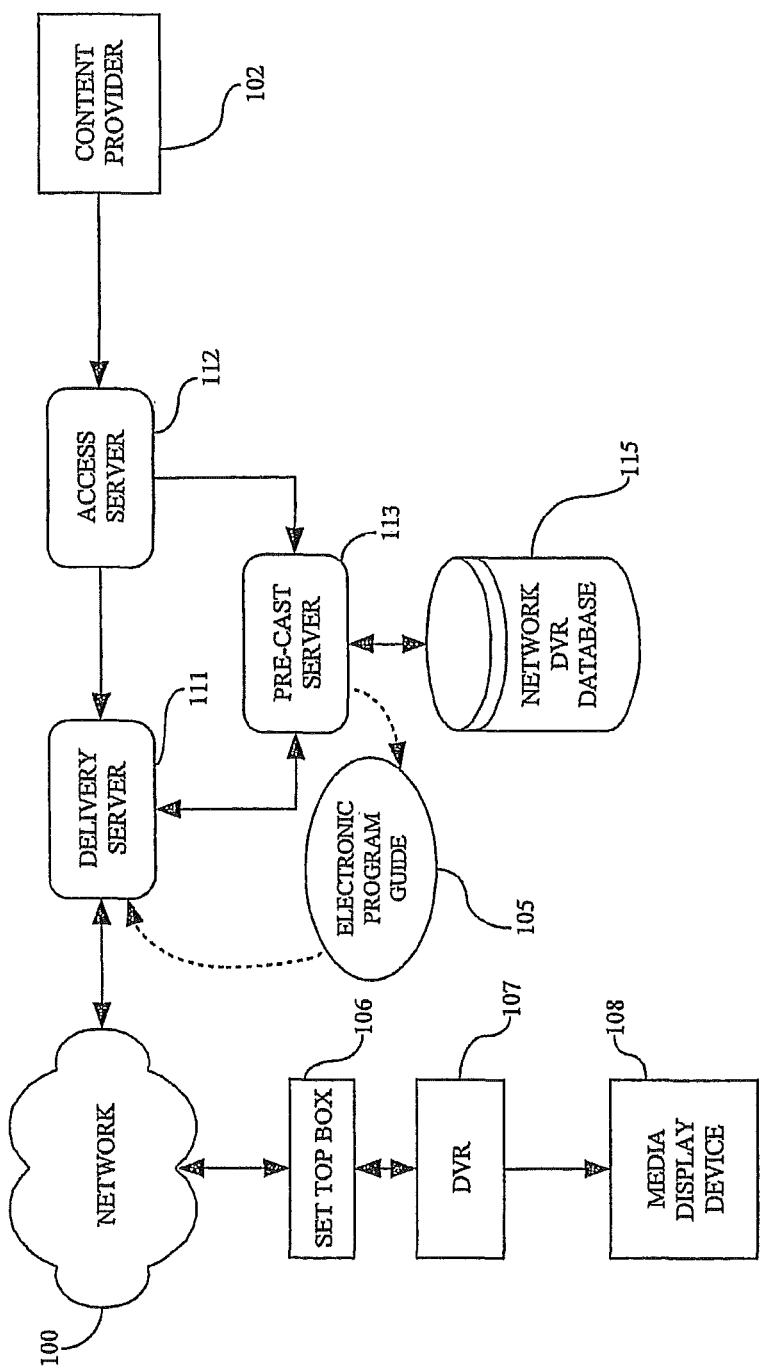
FIG. 1 is a simplified block diagram of a first exemplary system for delivering a program to a device in advance of a scheduled broadcast time for the program.

FIG. 1 is a simplified block diagram of an exemplary system for delivering a program to a device in advance of a scheduled broadcast time for the program. A content provider 102 is operatively coupled to an access server 112. The content provider 102 may be conceptualized as a head end, providing a plurality of channels, e.g., television channels. These channels may each be provided over one or more Internet Protocol (IP)-based communication links between the content provider 102 and a computing device, such as a set-top box (STB) 106, via the access server 112, a delivery server 111, and a network 100. Each IP-based communication link is associated with a corresponding IP address. One or more of the television channels carries a plurality of respective programs that are each broadcast at a corresponding scheduled broadcast time. One or more of the broadcast programs is associated with a corresponding program content identifier setting forth a name or descriptive information or both for a broadcast program. The program content identifier may, but need not, be included in a packet header of a multicast stream associated with the broadcast program.

During periods of peak viewing, the network 100 may become congested. For example, viewership generally peaks during the prime time hours of 7:00 PM to 11:00 PM Eastern Standard Time (EST), Monday through Friday. Viewership is dramatically reduced during the early morning hours between 12:00 AM and 6:00 AM. The capacity of the network is designed to accommodate peak hour constraints, with the result that excess capacity remains unused during the early morning hours. Accordingly, the bandwidth demand shifting techniques described herein utilize low-viewership periods to distribute one or more broadcast programs to viewers prior to the scheduled broadcast times for these programs. Such distribution, referred to as pre-casting, may be applied to one or more programs that are expected to be widely viewed or frequently viewed or both. These programs may be automatically stored on a viewer's digital video recorder (DVR) 107 and, pursuant to a first embodiment disclosed herein, cannot be accessed by the viewer until the scheduled broadcast time has been reached.

According to exemplary embodiments, upon arrival of the scheduled broadcast time, if the viewer requests to view the program, it is downloaded from the viewer's DVR 107 instead of being broadcast to the user over the network 100 in real time. Once the scheduled broadcast time of a program stored on the viewer's DVR 107 is reached, the program then becomes available to the STB 106 as a recorded program that can be selected and viewed from a designated video on demand (VOD) library. According to an exemplary embodiment, all pre-cast recordings are assigned a shelf life once they are placed into the VOD library. For example, up to one week's worth of recordings may be stored in the VOD library before these recordings are permitted to be overwritten. Additionally or alternatively, recordings could be retained or overwritten on the basis of a viewer's previous viewing tendencies. Illustratively, if a viewer never watches the television show "Lost", then after X weeks of keeping pre-cast recordings of "Lost" that are accessible from the VOD library for one week, the availability of a "Lost" broadcast could be shortened from one week to 36 hours. If the viewer then modifies their behavior by watching "Lost", the availability of a "Lost" broadcast could be changed from 36 hours to one week.

Some television channels do not broadcast during early morning periods of low viewership. Accordingly, it is possible to utilize such channels for purposes of pre-casting. Alternatively or additionally, one or more channels may be dedicated for the purpose of pre-casting. According to exemplary embodiments, the access server 112 is capable of monitoring the content provider 102 to determine when one or more channels are off the air, such that these channels can then be utilized for pre-casting. The access server 112 is also capable of routing one or more broadcast channels to the delivery server 111 for substantially immediate delivery in real time over the network 100, as well as routing one or more broadcast channels to a pre-cast server 113 for purposes of pre-casting. Selection of appropriate pre-cast times, pre-cast programs, and pre-cast channels may be performed using at least one of historical channel viewing, historical program viewing, or historical channel utilization data stored in one or more electronic files.

According to an exemplary embodiment, during the scheduled broadcast time, and beforehand, no evidence of the pre-cast content will be visible to the viewer. During the scheduled broadcast time, the pre-cast content may be played with the benefit of fast-forward and rewind up to the current, real-time point of the broadcast but no further. A broadcast window may be defined which starts at the scheduled broadcast time of a program and ends at termination of the program. Once the broadcast window ends, the pre-cast content may, but need not, be navigated on a viewer's DVR, such as the DVR 107, just like any other DVR recording. The concept of pre-casting may, but need not, be employed in the context of cable systems, internet protocol television (IPTV) systems, or other types of content delivery systems.

The pre-cast server 113 is operatively coupled to a network DVR database 115. The network DVR database 115 maintains recording information for each of a plurality of viewer DVRs, including the DVR 107. More specifically, the network DVR database 115 may associate each of a plurality of viewer or DVR identifiers with corresponding program recording parameters identifying programs the viewers are requesting to record. In this manner, a pre-cast stream could be initiated for one or more programs that a relatively high proportion of viewers wish to record. The pre-cast server 113 may, but need not, build a queue of pre-cast programs that are sent out over the network 100 in batch mode during periods of low network usage, wherein the program queue is sent out prior to the scheduled broadcast times for all programs in the queue, and preferably no later than prime time (illustratively, 7:00 PM). In order to determine these scheduled broadcast times, the pre-cast server 113 may utilize an electronic program guide (EPG) 105 that associates each of a plurality of respective program content identifiers with a corresponding scheduled broadcast time.

The pre-cast server 113 and the access server 112 are operatively coupled to the delivery server 111. The delivery server 111 is capable of sending one or more multicast broadcast streams, or one or more multicast pre-cast streams, or both, over the network 100. According to exemplary embodiments, each multicast broadcast stream and multicast pre-cast stream is associated with a corresponding IP address for a corresponding channel number or name. The delivery server 111 is capable of sending a signal to the STB 106 for placing the STB into a pre-cast mode such that viewing of the pre-cast channel is disabled at a media display device 108 operatively coupled to the DVR 107 and the STB 106. The delivery server 111, the access server 112, and the pre-cast server 113 are used to implement a processing mechanism for processing broadcast multicast and pre-cast multicast program streams. Although separate elements are shown for the delivery server 111, the access server 112, and the pre-cast server 113, this is for illustrative purposes. One or more of these elements may be combined into a single element. Alternatively or additionally, multiple servers may be utilized to implement one or more of the delivery server 111, the access server 112, or the pre-cast server 113.

A non-exhaustive list of examples for the network 100 includes wired or optical networks, such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof. The network 100 may include any combination of additional communication devices (not shown), such as gateways, routers, switches, and the like. Alternatively or additionally, the network 100 may be implemented using a wireless network. A non-exhaustive list of examples for a wireless network includes any network capable of implementing communication using Direct Sequence—Code Division Multiple Access (DS-CDMA), Global System for Mobile Communications (GSM), North American Digital Cellular (NADC), Time Division Multiple Access (TDMA), Extended-TDMA (E-TDMA), W-CDMA, GPRS, GSM, Enhanced Data for GSM Evolution (EDGE), 3G and 4G communication, wireless local area networks such as 802.11, Bluetooth™, Zigbee™, ultra wideband (UWB), or various combinations thereof.

Illustratively, the STB 106 and the DVR 107 comprise an exemplary viewer program storage device. Although the STB 106 and the DVR 107 are shown as separate items, this is for illustrative purposes as it should be clearly understood that the STB 106 and the DVR 107 may be implemented using a single hardware device such as a memory-equipped STB. The media display device 108 is any device capable of producing a humanly discernible output in the form of one or more video images, audible sounds, or both. Some illustrative types of media display devices include, but are not limited to, television sets, laptop computers, wireless telephones, personal digital assistants (PDAs), other Internet Protocol television (IPTV)-capable devices, and personal computers. These devices may be utilized in conjunction with any of a variety of different communication platforms, such as wireless telephony, IP-based communication, and others. The media display device 108 may also be included in the same device as the STB 106 and/or the DVR 107.

Figure 2A:
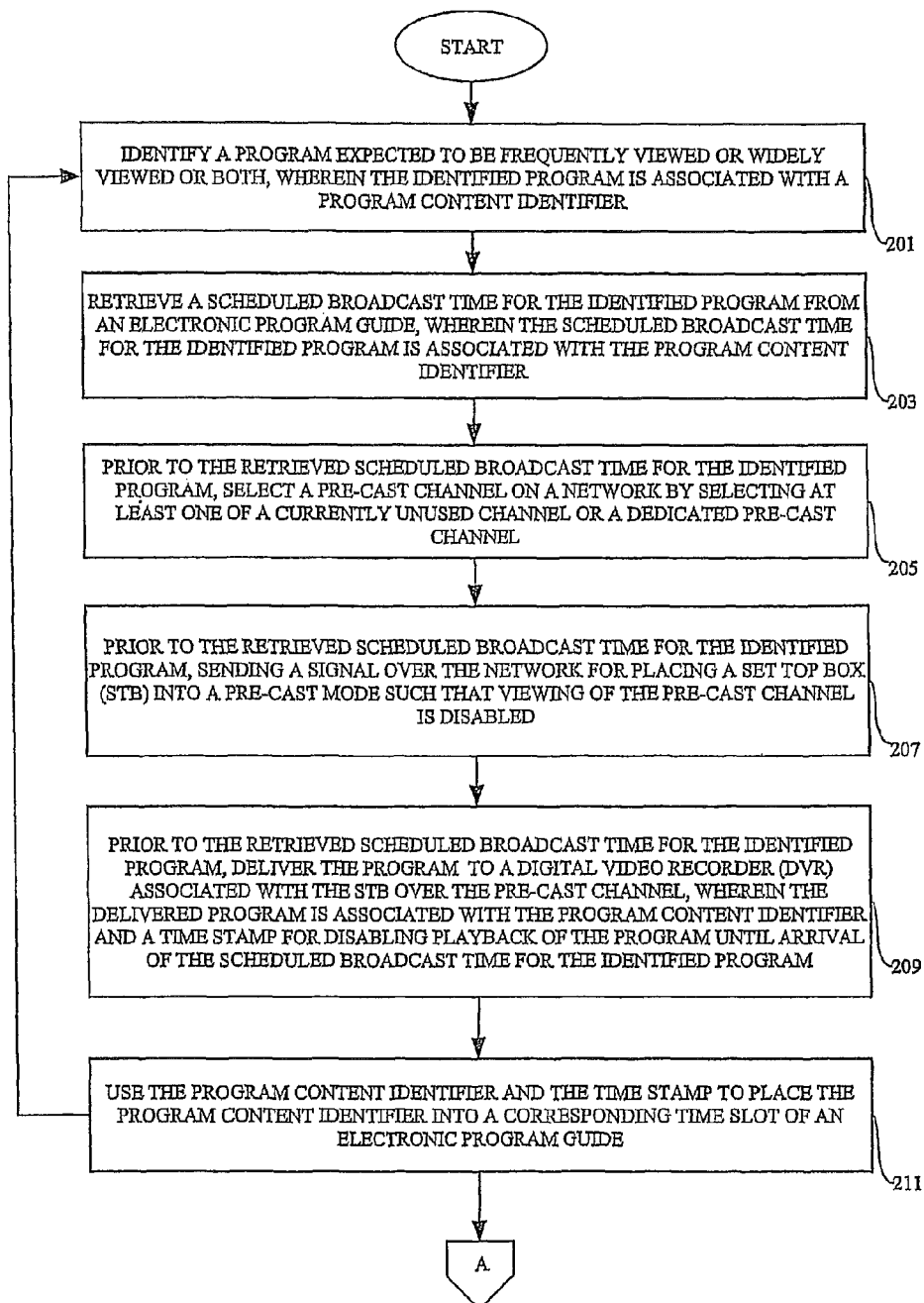
FIGS. 2A and 2B together comprise a flowchart of an exemplary procedure for delivering a program to a device in advance of a scheduled broadcast time for the program.
Figure 2B:
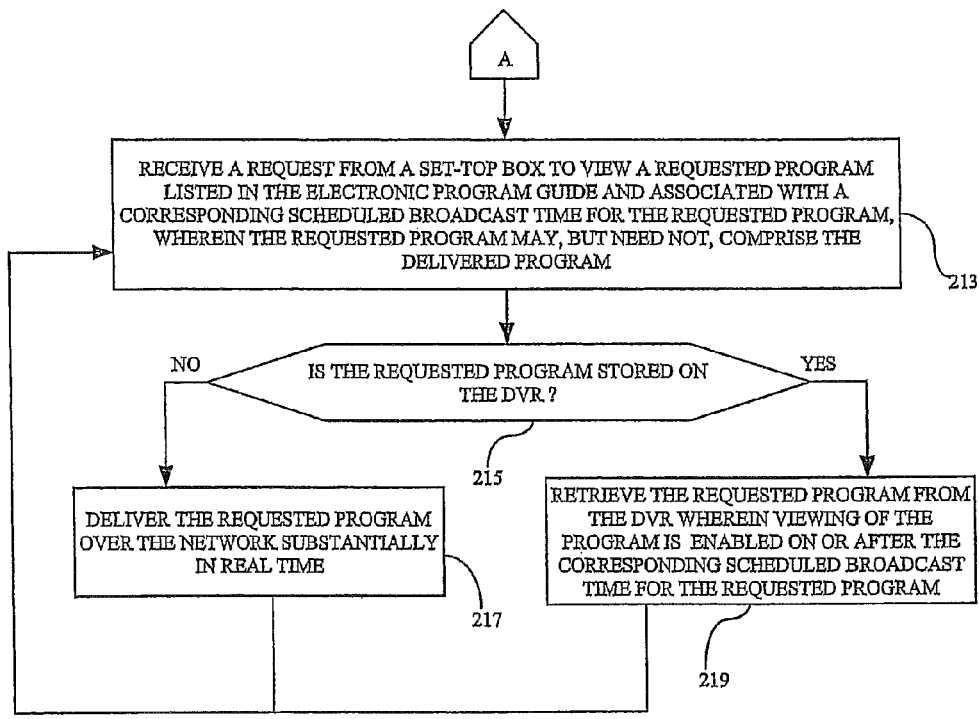

FIGS. 2A and 2B together comprise a flowchart of an exemplary procedure for delivering a program to a device in advance of a scheduled broadcast time for the program. The procedure commences at block 201 (FIG. 2A) where a program is identified that is expected to be frequently viewed or widely viewed or both. The identified program is associated with a program content identifier. Next, at block 203, a scheduled broadcast time for the identified program is retrieved from the electronic program guide (EPG) 105 (FIGS. 1 and 3), wherein the scheduled broadcast time for the identified program is associated with the program content identifier.

The procedure continues to block 205 (FIG. 2A) where, prior to the scheduled broadcast time for the identified program, a pre-cast channel is selected on the network 100 (FIG. 1) by selecting at least one of a currently unused channel or a dedicated pre-cast channel. At block 207 (FIG. 2A), prior to the scheduled broadcast time for the identified program, a signal is sent to the STB 106 (FIG. 1) for placing the STB into a pre-cast mode such that viewing of the pre-cast channel is disabled. Next (FIG. 2A, block 209), prior to the scheduled broadcast time for the identified program, the program is delivered to the digital video recorder (DVR) 107 (FIG. 1) over the pre-cast channel, wherein the delivered program is associated with the program content identifier and a time stamp for disabling playback of the delivered program until arrival of the scheduled broadcast time.

At block 211 (FIG. 2A), the program content identifier and the time stamp are used to place the program content identifier into a corresponding time slot of the EPG 115 (FIG. 1). A request is received from the STB 106 to view a requested program listed in the EPG and associated with a corresponding scheduled broadcast time for the requested program, wherein the requested program may, but need not, comprise the delivered program (FIG. 2B, block 213). At block 215, a test is then performed to ascertain whether or not the requested program is stored on the DVR 107. If the requested program is stored on the DVR 107, then the requested program is retrieved from the DVR at block 219, such that viewing of the program is enabled on or after the corresponding scheduled broadcast time for the requested program. Otherwise, if the requested program is not stored on the DVR 107 as determined at block 215, then the program is delivered over the network substantially in real time (block 217).

FIG. 3 is a graphical representation of an illustrative electronic program guide (EPG), such as the EPG 105, that may be employed in connection with the procedure of FIG. 2. According to exemplary embodiments, the electronic program guide (EPG) 105 associates each of a plurality of respective program content identifiers 304 for each of a plurality of illustrative broadcast channels 302 with a corresponding scheduled broadcast time, such as 8:00 PM, 8:30 PM, or 9:00 PM. The broadcast channels 302, shown for the New York metropolitan area, include WCBS-TV (2), WNBC-TV (4), WNYW-TV (5), WABC-TV (7), WWOR-TV (9), and cable channels Showtime™, HBO™, and Cinemax™. Each of these broadcast channels 302 may be associated with one or more corresponding multicast streams, each stream being associated with a corresponding IP address. Note that the techniques disclosed herein could be extended to cover other types of broadcasts in addition to, or in lieu of, television broadcasts. Such broadcasts illustratively include radio broadcasts, broadcasts of streaming audio, and Internet broadcasts.

Figure 4:
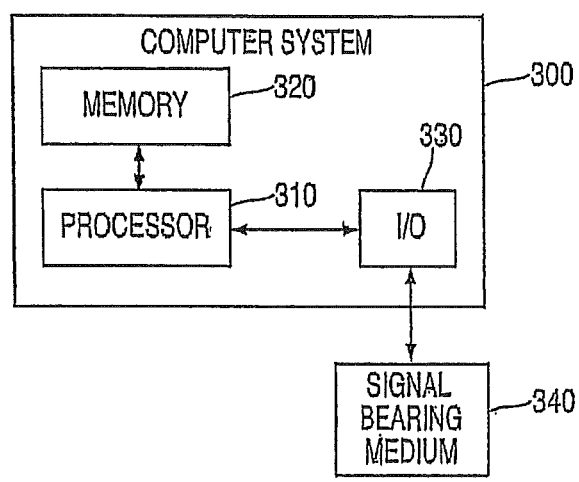
FIG. 4 is a simplified block diagram of a second exemplary system for delivering a program to a device in advance of a scheduled broadcast time for the program.

FIG. 4 is a simplified block diagram of a second exemplary system for delivering a program to a device in advance of a scheduled broadcast time for the program. The system includes a computer 300 operatively coupled to a signal bearing medium 340 via an input/output interface (I/O) 330. The signal bearing medium 340 may include a representation of instructions for delivering a program to a device in advance of a scheduled broadcast time for the program, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for implementing delivery of a program to a device in advance of a scheduled broadcast time, wherein the information is represented, e.g., on the signal bearing medium 340 and communicated to the computer 300 via the I/O 330, wherein the processor 310 saves information as appropriate into a memory 320. Illustratively, the processor 310 corresponds to the processing mechanism 106 of FIG. 1. Returning now to FIG. 4, this information may also be saved into the memory 320, e.g., via communication with the I/O 330 and the signal bearing medium 340. The processor 310 retrieves a scheduled broadcast time for the program, wherein the scheduled broadcast time is associated with a program content identifier for the program. Prior to the scheduled broadcast time, the processor 310 selects a pre-cast channel on a network by selecting at least one of a currently unused channel or a dedicated pre-cast channel Prior to the scheduled broadcast time, the processor 310 sends a signal to a viewer program storage device for placing the viewer program storage device into a pre-cast mode such that viewing of the pre-cast channel is disabled. Prior to the scheduled broadcast time, the processing mechanism 310 delivers the program to the viewer program storage device over the pre-cast channel, wherein the delivered program is associated with the program content identifier and a time stamp for disabling playback of the delivered program until arrival of the scheduled broadcast time. The foregoing steps may be implemented as a program or sequence of instructions within the memory 320, or on a signal bearing medium, such as the medium 340, and executed by the processor 310.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for delivering a program in advance of a scheduled broadcast time for the program, the method including:
   retrieving the scheduled broadcast time for the program, wherein the scheduled broadcast time is associated with a program content identifier for the program;
   prior to the scheduled broadcast time, selecting a pre-cast channel on a network by selecting a dedicated pre-cast channel;
   prior to the scheduled broadcast time, sending a signal over the network for placing a viewer program storage device into a pre-cast mode, such that viewing of the pre-cast channel is disabled;
   prior to the scheduled broadcast time, delivering the program to the viewer program storage device over the pre-cast channel, wherein the program is associated with the program content identifier and a time stamp for disabling playback of the program until arrival of the scheduled broadcast time;
   assigning a time period for the program, upon expiration of the time period permitting the program to be overwritten on the viewer program storage device; and
   adjusting the time period in response to a viewer viewing the program in its entirety, the adjusting the time period being applied to the program and other episodes of the program, wherein viewing of the program increases the time period relative to not viewing the program.

2. The method of claim 1 further including using the program content identifier and the time stamp to place the program content identifier into a corresponding time slot of an electronic program guide, and receiving a request to view a requested program listed in the electronic program guide and associated with a corresponding scheduled broadcast time for the requested program.

3. The method of claim 2 further comprising performing a test to ascertain if the requested program is stored on the viewer program storage device.

4. The method of claim 3 wherein, if the requested program is stored on the viewer program storage device, enabling viewing of the requested program upon the corresponding scheduled broadcast time for the requested program.

5. The method of claim 3 wherein, if the requested program is not stored on the viewer program storage device, delivering the requested program over the network.

6. The method of claim 1 further comprising selecting the pre-cast channel using historical channel utilization data stored in an electronic file.

7. The method of claim 1 further comprising selecting the program for pre-cast using historical program viewing data stored in an electronic file.

8. A non-transitory computer readable storage medium for delivering a program in advance of a scheduled broadcast time for the program, the non-transitory computer readable storage medium storing instructions for execution by a processing circuit for facilitating a method comprising:
   retrieving a scheduled broadcast time for the program, wherein the scheduled broadcast time is associated with a program content identifier for the program;
   prior to the scheduled broadcast time, selecting a pre-cast channel on a network by selecting a dedicated pre-cast channel;
   prior to the scheduled broadcast time, sending a signal over the network to a viewer program storage device for placing the viewer program storage device into a pre-cast mode such that viewing of the pre-cast channel is disabled;

prior to the scheduled broadcast time, delivering the program to the viewer program storage device over the pre-cast channel, wherein the program is associated with the program content identifier and a time stamp for disabling playback of the program until arrival of the scheduled broadcast time;

assigning a time period for the program, upon expiration of the time period permitting the program to be overwritten on the viewer program storage device; and adjusting the time period in response to a viewer viewing the program in its entirety, the adjusting the time period being applied to the program and other episodes of the program, wherein viewing of the program increases the time period relative to not viewing the program.

9. The non-transitory computer readable storage medium of claim 8 further including instructions for using the program content identifier and the time stamp to place the program content identifier into a corresponding time slot of an electronic program guide and receiving a request from the viewer program storage device to view a requested program listed in the electronic program guide and associated with a corresponding scheduled broadcast time for the requested program.

10. The non-transitory computer readable storage medium of claim 9 further comprising instructions for performing a test to ascertain if the requested program is stored on the viewer program storage device.

11. The non-transitory computer readable storage medium of claim 10 wherein, if the requested program is stored on the viewer program storage device, enabling viewing of the requested program upon the corresponding scheduled broadcast time for the requested program.

12. The non-transitory computer readable storage medium of claim 11 wherein, if the requested program is not stored on the viewer program storage device, delivering the requested program over the network.

13. The non-transitory computer readable storage medium of claim 8 further comprising instructions for selecting the pre-cast channel using historical channel utilization data stored in an electronic file.

14. The non-transitory computer readable storage medium of claim 8 further comprising instructions for selecting the program for pre-cast using historical program viewing data stored in an electronic file.

15. A system for delivering a program in advance of a scheduled broadcast time for the program, the system including:

an input mechanism for receiving a request for the program over a network;

a processing mechanism, operatively coupled to the input mechanism, wherein the processing mechanism receives a program content identifier that identifies the program and retrieves the scheduled broadcast time for the program from a program guide, wherein the scheduled broadcast time for the program is associated with the program content identifier such that, prior to the scheduled broadcast time for the program, the processing mechanism selects a pre-cast channel on the network by selecting a dedicated pre-cast channel;

the processing mechanism assigning a time period for the program, upon expiration of the time period the processing mechanism permitting the program to be overwritten on a viewer program storage device;

the processing mechanism adjusting the time period in response to a viewer viewing the program in its entirety, the adjusting the time period being applied to the program and other episodes of the program, wherein viewing of the program increases the time period relative to not viewing the program.

16. The system of claim 15 wherein, prior to the scheduled broadcast time for the program, the processing mechanism sends a signal to a set-top box for placing the set-top box into a pre-cast mode such that viewing of the pre-cast channel is disabled.

17. The system of claim 16 wherein, prior to the scheduled broadcast time for the identified program, the processing mechanism receives the program over the network and delivers the program to a digital video recorder over the pre-cast channel, and wherein the program is associated with the program content identifier and a time stamp for disabling playback of the program until arrival of the scheduled broadcast time.

18. The system of claim 17 wherein the processing mechanism uses the program content identifier and the time stamp to place the program content identifier into a corresponding time slot of an electronic program guide.

19. The system of claim 18 wherein the processing mechanism receives a request from the set-top box to view a requested program listed in the electronic program guide and associated with a corresponding scheduled broadcast time for the requested program.

20. The system of claim 19 wherein the processing mechanism performs a test to ascertain whether the requested program is stored on the digital video recorder and, if the requested program is stored on the digital video recorder, the requested program is retrieved from the digital video recorder wherein viewing of the program is enabled upon the corresponding scheduled broadcast time for the requested program; and, if the requested program is not stored on the digital video recorder, the processing mechanism initiates delivery of the requested program over the network.

* * * * *